United States Patent [19]
Koenck et al.

[11] Patent Number: 5,365,546
[45] Date of Patent: Nov. 15, 1994

[54] METHOD OF AND APPARATUS FOR CONTROLLING MODULATION OF DIGITAL SIGNALS IN FREQUENCY-MODULATED TRANSMISSIONS

[75] Inventors: Steven E. Koenck; Ronald L. Mahany; William W. Frede, all of Cedar Rapids, Iowa

[73] Assignee: Norand Corporation, Cedar Rapids, Iowa

[21] Appl. No.: 735,128

[22] Filed: Jul. 22, 1991

Related U.S. Application Data

[63] Continuation-in-part of Ser. No. 467,096, Jan. 18, 1990, Pat. No. 5,052,020.

[51] Int. Cl.[5] .................................. H04L 27/12
[52] U.S. Cl. .............................. 375/9; 375/62; 332/125
[58] Field of Search .................. 375/7, 8, 9, 62, 76; 455/115, 116; 332/100, 117, 118; 307/356, 358, 530

[56] References Cited

U.S. PATENT DOCUMENTS

| 3,801,911 | 4/1974 | Von Horsten | 375/9 |
| 4,270,206 | 5/1981 | Hughes | 375/9 |
| 4,411,005 | 10/1983 | Leslie | 375/65 |
| 4,926,444 | 5/1990 | Hamilton et al. | 375/9 |
| 5,050,189 | 9/1991 | Cox et al. | 375/39 |
| 5,052,020 | 9/1991 | Koenck et al. | 375/62 |

FOREIGN PATENT DOCUMENTS 0207291 7/1987 European Pat. Off. .

Primary Examiner—Stephen Chin
Attorney, Agent, or Firm—McAndrews, Held & Malloy, Ltd.

[57] ABSTRACT

An interface device interacts between a digital data terminal and a frequency modulated analog transceiver module to control data flow between the digital data terminal and the transceiver module and to adapt the transceiver module to transmit digital data signals and to communicate messages containing digital signals to the digital data terminal. The interface circuit includes a digitally implemented signal shaping circuit which samples an analog quiescent state bias signal level of a voltage controlled oscillator circuit of the transceiver module. The signal shaping circuit samples and converts the sampled quiescent bias signal level to an equivalent digital data value. The digital equivalent value is increased by and decreased by a predetermined deviation value, thereby generating equivalent values of high and low modulation bias voltage levels. The interface device includes a programmable memory for storing a number of reference values which allow the interface device to be configured to normalize data signals and control sequences in accordance with operating characteristics of any one of a number of available transceiver modules. The stored reference values control timing sequences for initiating and shutting down a transmit cycle, for storing predetermined maximum deviation values for the modulation bias signal of transmitted data messages, and for demodulating received signals.

27 Claims, 7 Drawing Sheets

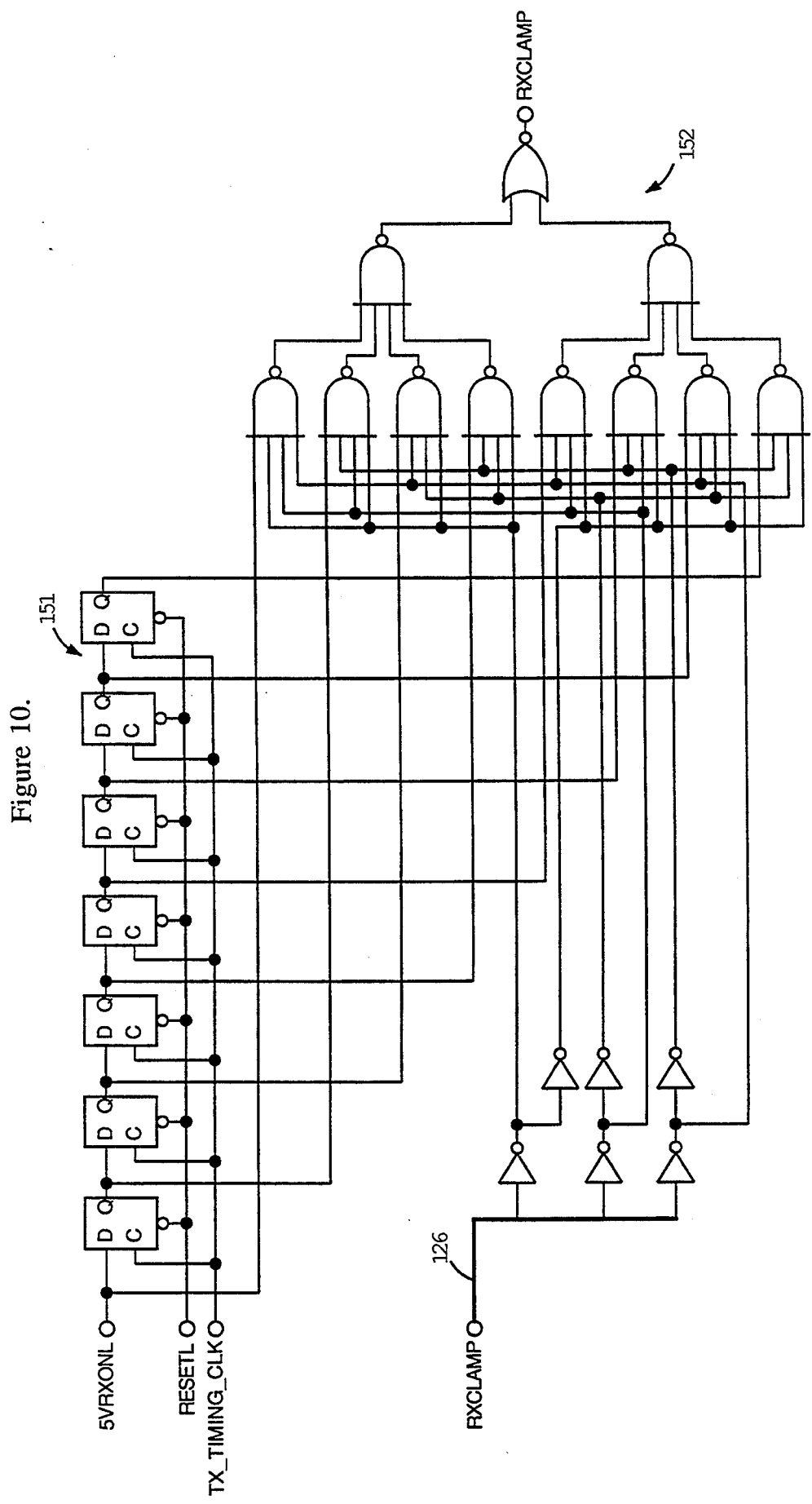

METHOD OF AND APPARATUS FOR CONTROLLING MODULATION OF DIGITAL SIGNALS IN FREQUENCY-MODULATED TRANSMISSIONS

CROSS REFERENCE TO RELATED APPLICATIONS

This is a continuation-in-part of copending application by S. E. Koenck and R. L. Mahany, Ser. No. 07/467,096, filed Jan. 18, 1990, now U.S. Pat. No. 5,052,020.

BACKGROUND OF THE INVENTION

1. Field of the Invention

The invention relates generally to communicating digital signal messages and particularly to communication interfaces between data storage and processing apparatus and frequency-modulated radio frequency transceivers for communicating such data.

2. Discussion of the Prior Art

Standards for most radio-frequency communications are of such stringency that temperature compensation networks are generally necessary to enable crystal oscillator circuits to maintain an established channel frequency over a specified temperature range. Compensation networks, typically including a thermistor, are used to stabilize carrier frequencies of crystal oscillator circuits over typically specified temperature ranges, such as from negative thirty degrees centigrade to positive sixty degrees centigrade.

Several radio frequency transceiver modules for conventional audio transmissions are available from commercial suppliers. Each may differ in interface, timing and analog characteristics. Even though input and output characteristics of transceiver modules may differ, their operating modes are similar. While it might be desirable to adapt available audio-type transceivers to the communication of data in the form of digital signals in binary format, particular interface problems present themselves primarily because of asymmetric signal amplitudes with respect to a quiescent, or steady state, signal level or voltage of a data signal string in comparison to a typical voice communication sequence. Further problems relate to communicating strings of binary digital signals over a radio frequency environment between digital type end user modules, particularly when various transceiver modules of the environment respond to different bias conditions or timing characteristics.

A state of the art FM modulating circuit typically includes a series coupled combination of a capacitor and a varactor diode. The node between the varactor diode and the capacitor is adapted to receive a voltage type signal input for modulating the channel frequency output of the crystal oscillator circuit. Variations in voltages of input signals to the node cause corresponding shifts in the capacitance of the varactor diode and, hence, in the frequency of oscillation of the oscillator circuit. Consequently, the quiescent or steady state voltage at the node constitutes a signal voltage reference at which the crystal oscillator circuit oscillates at its unmodulated channel frequency. Temperature compensation, typically including a thermistor circuit, is applied to the node to compensate for temperature related shifts in performance of the components.

Voice signals typically have no DC component. Such signals can consequently be superimposed through a series-coupled input capacitor on the established, temperature compensated voltage at the node. Without a DC current input to the node the reference voltage at the node and, hence, the channel frequency of the circuit remain stable. If capacitive coupling is not used, and the signal impressed on the input node does include a DC component which differs from the temperature-compensated steady state reference voltage at the node, the reference voltage at the node would be shifted. Such shift, in turn, would shift the channel frequency of the transmission signal with respect to which the modulated signal is centered. Depending on the magnitude of the voltage shift, the modulated frequencies may become shifted beyond allowable limits, such as, for example, those established by the Federal Communication Commission.

Digital data signals typically include a DC component which would tend to cause such signals applied through the typical capacitive coupling to become distorted with what is referred to as "jitter". In state of the art digital signal transmissions, jitter is controlled by electronic transformation or encoding of digital signals. Encoding and subsequent decoding of signals is likely to affect, however, the speed or reliability of data transmission between transceivers.

Consequently, it would be desirable to transmit digital signals over any of various types of traditional voice frequency transceiver units without a need for encoding and subsequently decoding the data signals and not to be concerned about eliminating DC components from a digital data string. It would further be desirable to allow an interfacing of data signals at given signalling rates and signal levels between various types of communication modules by means of any of such various types of voice frequency transceiver units.

SUMMARY OF THE INVENTION

It is therefore an object of the present invention to provide a means for allowing any of a number of traditional analog radio transceivers, which were designed for voice type communications, to be used for transmission of digital data messages without a need for eliminating a DC component from the digital data codes.

It is another object of the invention to provide a digital logic means for referencing a string of digital data to a voltage or signal datum at an input node before applying the data to the node.

It is yet another object provide a digital logic reference for maintaining a reference signal level over a prolonged data transmission period.

It is a further object of the invention to provide a communications interface including digital and analog functions to interface digital signal transmissions with any of a number of voice transmission radio transceiver modules.

It is yet a further object of the invention to digitally program a communications interface for a selected one of a number of available of voice communications transceivers to adapt such selected transceiver to communicate in accordance with a predetermined standard.

In accordance with the invention, a communication interface circuit for adjusting a signal amplitude or level of timed, binary signals of data transmissions with respect to a reference voltage level includes a sampling circuit which samples a quiescent or steady state reference signal level, or reference voltage level, and stores a digital code representative of the reference voltage level. The reference voltage level in turn is the quiescent signal level for generating an unmodulated frequency or channel frequency of an FM transmitter. A digital signal processing circuit, also referred to as a signal shaping circuit, generates upper and lower digital code values with respect to the stored digital code. The upper and lower digital code values are representative of respective upper and lower modulation signal limits for transmitting data as binary signals via the FM transmitter.

According to another aspect of the invention, a communication interface circuit includes a signal shaping circuit for digitally generating input signals to a crystal oscillator circuit with signal levels determinative of acceptable upper and lower frequency deviations from a channel or quiescent frequency of an FM transmitter during binary data transmissions. The signal shaping circuit includes a first circuit for converting an analog reference signal level or voltage to a digitally encoded signal value and for storing the digitally encoded reference signal value. The signal shaping circuit further includes digital logic provisions for adding and for subtracting a predetermined digital signal value from the stored reference signal value to generate first and second digital modulation values. A digital to analog converter circuit of the signal shaping circuit is coupled to the digital adding and subtracting logic provisions to generate analog signal levels determinative of the upper and lower frequency variations for binary data transmissions.

In another aspect of the invention, the communication interface circuit includes a memory provision for alterably storing a plurality of reference values. Certain of the reference values are selected to configure circuit elements of the communication interface circuit to normalize signals received from a correspondingly selected radio frequency receiver which normalized signals are in a format receivable by a digital data terminal. Others of the reference values are selected to adapt digital data signals received by the communication interface circuit for transmission by a radio frequency transmitter.

BRIEF DESCRIPTION OF THE DRAWINGS

The Detailed Description of the Invention including a detailed description of a preferred embodiment thereof will be best understood when read in reference to the accompanying drawings wherein:

FIG. 10 is a schematic diagram of a receive detector clamp control circuit, showing a digital reference value decoding and gating circuit as a preferred implementation of decoding a reference value in accordance herewith.

DETAILED DESCRIPTION OF THE INVENTION

A Crystal Oscillator

Figure 1:
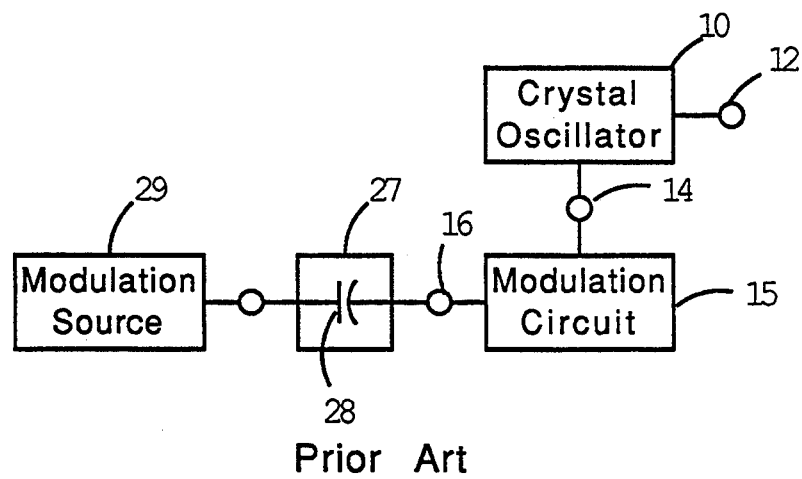
FIG. 1 is a schematic diagram of a representative modulation and crystal oscillator circuit of the prior art to which the present invention applies.

FIG. 1 shows a prior art crystal oscillator circuit 10 of a typical, state of the art radio frequency voice transmission radio. During the operation of the oscillator circuit 10, the frequency modulated signal on the output terminal 12 corresponds to the voltage of a bias signal applied to the signal input terminal 14. The signal input terminal 14 represents an open end of a capacitive loading network of the oscillator circuit 10. A modulation circuit 15 typically capacitively coupled between the crystal oscillator 10 and a modulation input terminal 16 typically includes temperature compensation circuits. Operational details of a typical prior art modulation circuit 15 are disclosed in copending application by S. E. Koenck and R. L. Mahany, Ser. No. 07/467,096, filed Jan. 18, 1990, now U.S. Pat. No. 5,052,020.

A capacitive coupling circuit designated generally by the numeral 27, represented generically in FIG. 1 by a capacitor 28, is typically interposed between the modulation input terminal 16 and a modulation signal source 29, such as microphone or other amplified voice or sound signal source. The coupling through the capacitor 28 isolates any DC component of the modulation signal source 29. It is desirable to apply a digital data modulation signal from a digital data source 30 to the modulation input terminal 16 without having to apply the digital data stream through the capacitor 28.

A Data Transmission Shaping Circuit

The descriptive portions of the specification of referenced copending application, Ser. No. 07/467,096, filed Jan. 18, 1990, assigned to the assignee of the present application, are in their entirety incorporated herein by reference. The incorporated descriptive matter of the specification discloses particularly a data transmission shaping circuit 31 which effectively neutralizes any DC signal effects of binary or digitally encoded data transmissions and allows digitally-encoded signal messages to be applied directly to the modulation input terminal 16 of the modulation circuit 15 without the need for the capacitive coupling circuit 27. The disclosed circuit 31 executes the desired functions in an analog type operation. A reference signal is directly sampled and held as an analog signal voltage. High and low modulation signal amplitudes are generated by adding and subtracting predetermined voltage levels from the sampled reference voltage.

Figure 2:
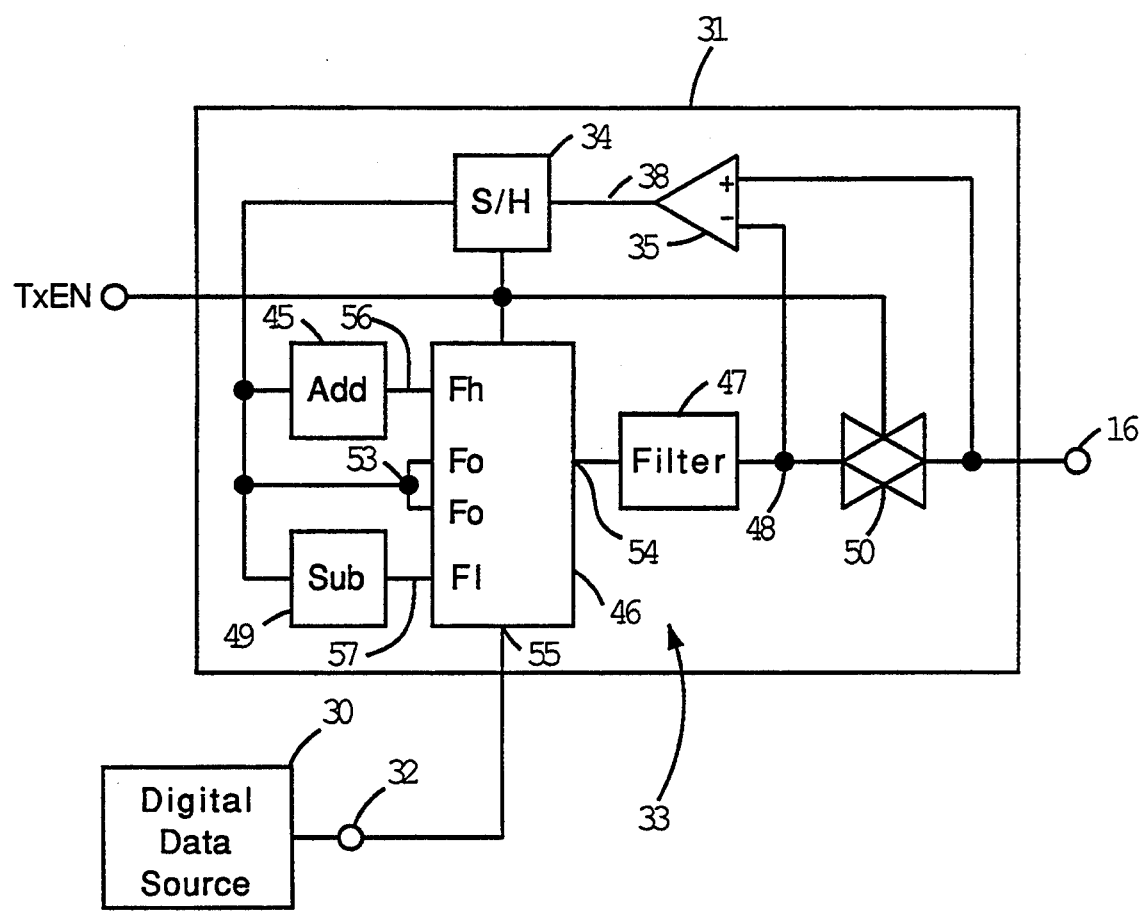
FIG. 2 is a schematic diagram of a digital data transmission signal input shaping circuit, implemented in analog signal functions.

FIG. 2 is a block diagram of major functional elements to refer in general to the analog signal shaping circuit 31 for generating binary signal amplitudes for digital data transmissions, as described in detail in the above referred to copending application. Functionally, the circuit 31 is interposed between a transmitted data input terminal 32 and the modulation input terminal 16. The transmitted data input terminal 32 may be coupled to, and is symbolically representative of an input terminal for any of a number of sources of digital data which may be generated, transmitted or otherwise provided to be applied to the modulation input terminal 16. It is understood that digital data may be a single data pulse or a string or train of data pulses comprised of any combination of logical "ones" and "zeroes", hence data pulses of typically two different signal levels or voltages with respect to a reference voltage or datum. One of the signal levels may be at ground, and ground may also be used as the reference. Signals of various amplitudes may be applied to the shaping circuit 31. The shaping circuit 31 generates signal levels, or voltages of a predetermined amplitude, which voltages are then applied in substitution to the terminal 16 as herein further described.

The shaping circuit 31 includes a signal level, or voltage referencing functional component group 33 which interacts with a selectively activated signal sampling circuit 34. An input amplifier 35 couples the sampling circuit 34 to the terminal 16 and applies a sampled quiescent, or steady state, bias signal or voltage from the terminal 16 through an output signal terminal 38 to the sampling circuit 34. The sampling circuit 34 then holds the sampled voltage as a reference voltage. The signal level referencing component group 33 generates appropriate signal levels for logical "ones" and "zeroes" with respect to the sampled reference voltage. To generate a logical "one" signal, for example, an adder circuit 45 superimposes the signal level onto the sampled reference voltage. When during a transmit enable period ("TxEN") digital data signals of typically unregulated amplitude levels are applied to the transmitted data input terminal 32, an analog switch 46 is activated. The switch 46 generates in accordance with the logical ones and zeroes of the transmitted digital data signals a bias signal sequence of precisely defined voltage levels with respect to the sampled reference voltage at the sample and hold circuit 34. The bias signal sequence is passed from the switch 46 through a low pass, signal shaping filter 47 to an output terminal 48 and from there to the modulation input terminal 16. A subtract circuit 49 subtracts the signal level from the sampled reference voltage to generate logical zero signals of the bias signal sequence.

During the voltage sampling phase in the absence of the transmit enable signal, the output terminal 48 from the filter 47 remains isolated from the modulation input terminal 16 by a solid state switch 50 which remains open during the voltage sampling phase and is driven into a closed or shorted state at the beginning of a signal transmission by a transmit-enable signal, as identified in FIG. 2 by the designation "TxEN". The open state of the switch 50 during the voltage sampling or non-transmit phase also isolates the steady state bias voltage at the modulation input terminal 16 from being shorted to the feedback voltage at the output terminal 48 of the filter 47.

The transmit-enable signal is also applied to the analog switch 46, setting the switch 46 from its $F_0$ or rest position to a signal transmit position. In the described embodiment, the switch 46 is a typical circuit having two sets of switchable terminals. One such set of two terminals is coupled together or in parallel to form a single terminal 53, also designated on the diagram in FIG. 2 by $F_0$. In the rest position, namely the absence of the "TxEN" signal, the switch 46 couples the reference voltage between the terminal 53 and an output terminal 54. During transmit-enable periods, data in binary or digital format are applied to a respective data terminal 55, and the switch 46 toggles between high and low signal voltage terminals 56 and 57 ($F_h$ and $F_l$) to pass respective high or low data pulses to the filter 47 in response to high or low binary data input signals appearing at the data terminal 55.

The filter 47 is a typical data transmission filter which shapes transitional profiles of the data signal pulses in preparation for their application as a frequency modulation input at the modulation input terminal 16. The respective magnitudes of the voltages applied to the filter 47 remain referenced with respect to the steady state DC bias voltage at such modulation input terminal 16 as sampled during the most recent update by the selectively activated sampling circuit 34. Frequency shifts which might have resulted from a DC component of the transmitted data string applied to the terminal 16 are avoided.

A Digitally Controlled Signal Shaping Circuit

The shaping circuit 31 of referenced copending application, Ser. No. 07/467,096, filed Jan. 18, 1990, is changed in function by substituting digital circuits for certain of the referred to analog functions and circuits. Because of conversions between digital and analog signals, a digital circuit methodology in an essentially analog environment may appear more cumbersome. However, as will be seen, digital control of reference values provides added advantages and accuracy.

Figure 3:
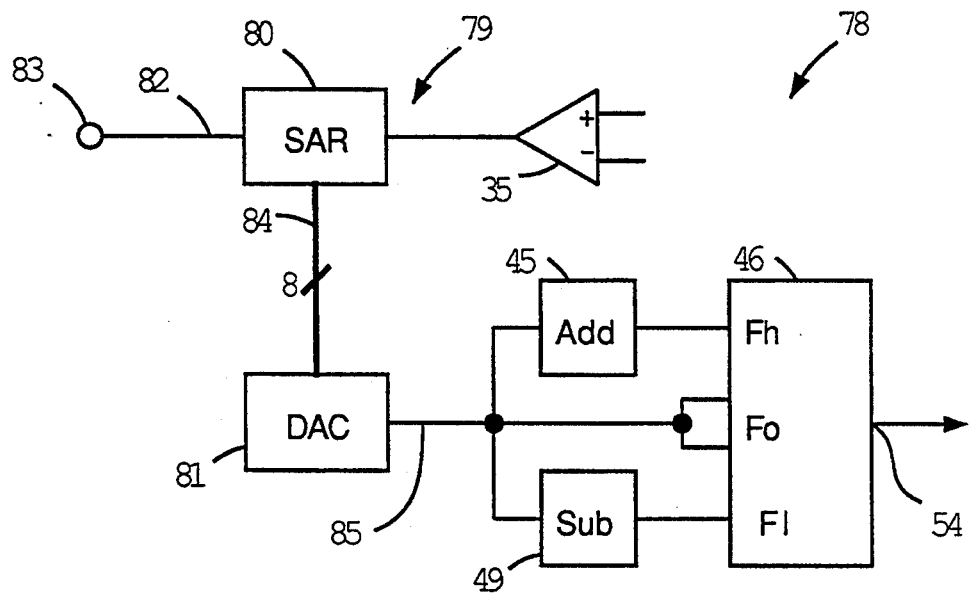
FIG. 3 is a schematic diagram of a digital data transmission signal shaping circuit wherein the shaping function is implemented with digital logic and is then converted to analog signal levels.

FIG. 3 is a schematic diagram of elements of a signal shaping circuit 78, similar in certain respects to the described shaping circuit 31, but which uses digital signal processing methodology for controlling the level of the quiescent modulator bias signal or reference voltage. In FIG. 3, the sampling circuit 34 of FIG. 2 is replaced with a digital quiescent signal level sampling circuit which is designated generally by the numeral 79. The sampling circuit 79 is shown to include a successive approximation register circuit 80 ("SAR") and a digital-to-analog converter 81 ("DAC"). Both the approximation register circuit 80 and the converter circuit 81 are components that are known in the art. Storing an analog signal voltage as a digitally encoded value for use after conversion to an analog signal by the converter 81 allows the equivalent digital value of the reference voltage to be stored at its encoded value for an indefinite time. This is in contrast to storing the analog signal as a charge in a capacitor which may undergo changes in time to affect the desired deviations of the ultimately generated modulated signal. The terminal 16 (see FIG. 2) is coupled in the described manner through the amplifier 35 to the register circuit 80 to apply the quiescent signal level to the register circuit 80. The register circuit 80 uses a well known successive approximation function to sample the quiescent signal level to convert it to, and to store, an equivalent digital, binary encoded, reference value.

The approximation register circuit 80 samples the quiescent bias signal periodically when selectively activated by an enablement signal applied to an enablement input terminal 83 and to the approximation register circuit 80 via a control line 82. Selectively controlling the enablement signal in turn allows the timing and sampling rate of the register circuit 80 to be readily controlled.

Typically, the digital value of the reference signal or voltage is an eight bit digital word, although a greater or lesser number of bits can be used for greater or lesser resolution of the sampled signal. The digital approximation signal is preferably applied in parallel as an output signal from the register circuit 80 to the digital-to-analog converter 81 via a data line or bus 84. Of course the number of individual data output lines in the parallel line or bus 84 corresponds typically to the number of bits encoded as the digital value of the reference signal.

The enablement signal only enables the register circuit 80 when a new sample of the quiescent signal or reference voltage is to be sampled and processed by the signal shaping circuit 78. The new processed value of the sampled reference voltage will be retained by the register circuit 80 until it is again activated by the enablement signal for a subsequent sampling of the quiescent signal level. The digital-to-analog converter 81 converts the digital approximation signal appearing on bus 84 to an analog voltage equivalent to the sampled reference voltage and applies the corresponding analog voltage signal via output line 85 to the respective analog circuits, such as the adder circuit 45, the subtractor circuit 49 and the analog switch 46 in the generation of the modulated data signal as described with respect to FIG. 2, for example.

A Digitally Controlled Communication Interface Circuit

Figure 4:
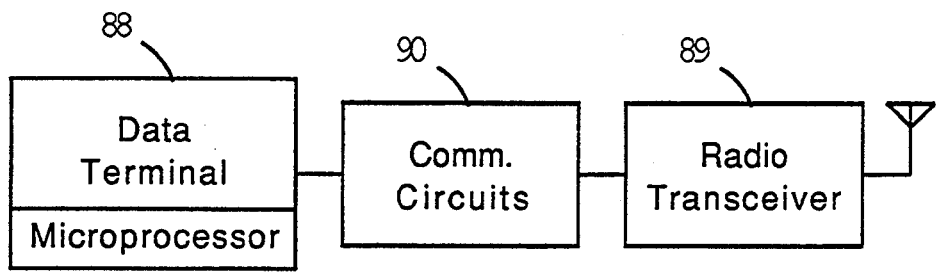
FIG. 4 is a schematic diagram representing a functional combination of a data terminal and a radio transceiver module which are coupled via a communication interface circuit including features of the present invention.

FIG. 4 shows schematically, as a block diagram, the coupling of a data terminal 88, the data terminal 88 being typically a microprocessor-controlled digital logic device, to an analog communications channel or device 89. In further reference to the analog communication device, an FM radio frequency transceiver module 89 is particularly described as a preferred example of an analog device. The advantages, though particularly applicable to the FM analog transceiver module 89, as described herein, may be similarly realizable when it is desired to interactively couple the digital data terminal 88 or any other digital data source to an analog device other than the described transceiver module 89. In accordance herewith, the data terminal 88 is functionally coupled to the transceiver module 89 via a communication interface circuit which is designated generally by the numeral 90. In operation, the data terminal 88 may transfer data via the communication interface circuit 90 to the radio transceiver module 89 to be transmitted by the module 89. Alternatively, the data terminal receives digital logic data from the radio transceiver module 89 via the communication interface circuit 90. Control signals to power up the transceiver module 89, or to shut it down, are also relayed via the communication interface circuit 90. Thus, in general, the communication interface circuit 90 interacts in substantially all functions between the microprocessor-controlled data terminal 88 and the radio transceiver module 89.

As will become apparent from the following description of the communication interface circuit 90, significant functions for normalizing radio received signals may have independent significance with respect to other functions for adapting digital data messages to be transmitted over a radio frequency transmitter device, and vice versa. However, added advantages reside in the described controls for fully interfacing signals in both directions across the interface, the circuit 90, between the data terminal 88 and the transceiver module 89.

Various commercially available transceiver modules for voice or analog type frequency modulation are found to be adaptable for digital signal transmissions with the function as implemented by the above-described signal shaping circuit 78. However, operating characteristics of various transceiver modules vary among each other and particularly among different types, or those from different manufacturers. Operating voltages, frequency deviations in response to applied modulation signal levels, noise characteristics resulting from switching between transmit and receive operations, carrier detect threshold levels, DC bias levels and signal to bias level of received signals are variable transceiver characteristics. The communication interface circuit 90 includes circuit functions for normalizing various operating characteristics of selected transceiver modules 89. As a result, variations of transceiver operating characteristics from a norm become transparent to the data terminal 88. As may be realized from the further description hereof, the communication interface circuit 90 employs digital logic in the manipulation of analog quantities to produce normalized, desired output functions from the transceiver module 89. The following description of the communication interface circuit 90 may be best understood in reference to the schematic block diagram of the circuit 90 as illustrated in FIGS. 5, 6, 7 and 8. Since described functions flow between the illustrations of FIGS. 5, 6, 7 and 8, the continuing terminations are identified with outgoing and inward pointing arrow heads and with names of functions for identification. Circuit terminations which become coupled to either the data terminal 88 or to the transceiver module 89 are identified by circles. It should be understood that in a preferred embodiment of the invention as an integrated circuit, it may be desired to protect each of such contact pads with typical electrostatic discharge ("ESD") protection circuits in accordance with known techniques as may be available from commercial chip design and supply sources.

Figure 5:
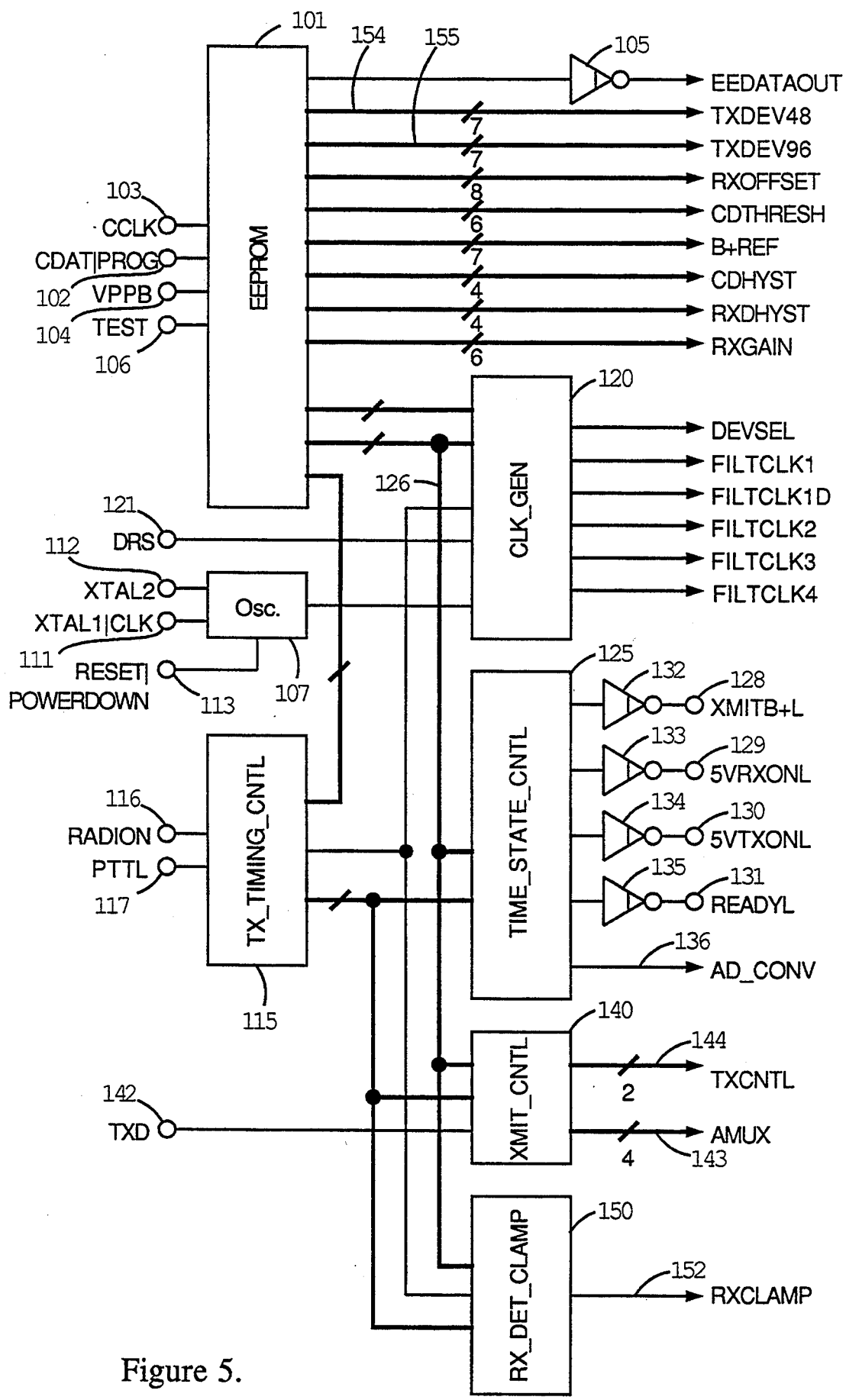
FIGS. 5, 6, 7 and 8 are schematic diagrams of circuits and functions of the communication interface circuit shown in FIG. 4.

FIG. 5 illustrates "housekeeping" functions of the communication interface circuit 90. Such housekeeping functions include generation of a circuit-specific time cycle for the communication interface circuit 90 and timing signals to sequentially start up and shut down a transmit function of the transceiver 89 (in FIG. 4), and to switch between transmit and receive states of the transceiver. The time cycle may be, for example, a sixteen-state cycle during which a certain number of control states are used to power up the transmitting function of the transceiver, followed by a time period during which data are transmitted, with a remainder of the cycle used to power down the transmitting function. A time state locking function may hold the control states in a certain state until after the release of the "PTTL" function. Also, a data receive function selectively may be delayed following the end of a data transmit cycle.

The communication interface circuit 90 is configured to a specific transceiver by programmed reference values stored in an electrically programmable read-only memory register or circuit 101 ("EEPROM"). In general, digital logic values or data are stored in the memory circuit 101 to be decoded and used in the determination of timing pulse sequences or lengths, or for establishing magnitudes or shapes of control signals for a particular transceiver module 89. It should be understood that within the scope of the invention a circuit element other than the non-volatile EEPROM may be used for storing such data. However, the EEPROM circuit provides a non-volatile memory in combination with the ability to change programmed reference values, if necessary. The stored reference values constitute a look-up table of values which are used in the operations of the communication interface circuit 90. Typically, the reference values are loaded into the memory circuit 101 once the characteristics of the particular radio have been established and are not subject to change over the service life of the transceiver.

The reference values are either already known, or may be determined by fine tuning the operation of, or calibrating, a particular transceiver module 89 to achieve the desired normalized operating characteristics from the particular module 89. Once the transceiver 90 has been calibrated, all values are stored in the memory 101 in a single programming operation. In a preferred embodiment of the communication interface circuit 90 in the form of an integrated circuit, the memory 101 has the capability of storing 127 bits of data. The bit pattern is programmed serially into the memory on a CDAT/PROG input terminal 102 with a configuration clock signal applied to CCLK terminal 103. The terminal 104 provides for a programming voltage ("VPPB") to be applied to the memory circuit 101. The programming voltage must have a controlled ramp-up voltage, a hold voltage, and a ramp-down voltage for the EEPROM bits or data to become properly programmed or loaded. Once loaded, the data may be verified by parallel loading a verification register of the memory 101 and then shifting the data out to be verified via a buffered output terminal 105 ("EEDATAOUT"), activated by pulsing the test terminal 106 ("TEST") to a logical high.

In the preferred memory circuit 101 of 127-bit storage capacity, a preferred number of 21 different programmable reference values of preferred length may be stored. The number of storage bits needed for each of the quantities may vary according to the complexity of the stored number. For a look-up value which represents one of a relatively large number of possible choices of values, a greater number of bits are reserved than for a reference quantity which represents merely a "yes-or-no" choice to be stored with a logical one or zero in a single bit of the memory circuit 101. The reference values which are desirably programmed into the look-up table of the memory circuit 101 may be applied to individually tailor either digital or analog functions. Digital functions or quantities which may be determined by stored reference values are generally timing signal frequencies, timed signal lengths, or a signal inversion choice relating to a transmitted or outgoing data signal. Analog functions which may be predetermined by stored digital reference values may be signal levels or voltage levels of bias voltages, for example. Though some programmed reference values may have been provided as a matter of convenience, others are advantageous in implementing the features of the invention. Though the storing of particular reference values in the memory circuit 101 may be in furtherance of achieving advantages of the invention, it should be understood that alternative ways of selectively altering affected characteristics of the described circuit are envisioned. Also, in reference to bit lengths of stored values, it should be realized that in a majority of the stored values the number of bits allocated to each value is a matter of choice. All timing functions are generally based on, but not directly activated by, a master clock function.

Figure 9:
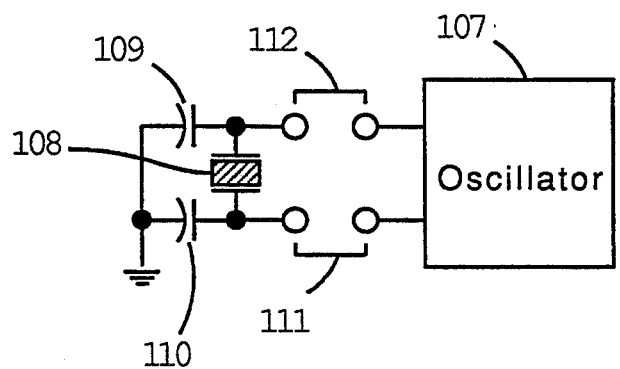
FIG. 9 is a schematic diagram showing an external attachment of an oscillator crystal and a capacitor network to an oscillator circuit shown in FIG. 5.

The master clock function is illustrated by an oscillator circuit 107 ("OSC"). The oscillator circuit 107 provides for flexibility in that a crystal 108 within a desirable range may be externally attached (see FIG. 9) to drive the communication interface circuit 90. In the alternative, an external clocking signal may be applied. When the external crystal 108 is used (as shown in FIG. 9), the respective crystal and capacitors 109 and 110 may be coupled across clock terminals 111 and 112 ("XTAL1/CLK" and "XTAL2", respectively). When the external clocking signal is used, a CMOS logic level signal may be connected to the terminal 111, the terminal 112 being left unconnected. A terminal 113 ("RESET/POWERONL") is a reset terminal through which reset and power down signals may be applied. For the communication interface circuit 90 to be powered continuously by a battery of the data terminal 88, for example, current consumption in the shutdown mode of the communication interface circuit 90 is desirably at a minimum. The RESET/POWERONL signal desirably provides a dual function of applying a reset signal to the communication interface circuit 90 and also applying a low current bias signal to analog circuit portions of the communication interface circuit.

A transmitter timing control circuit 115 ("TX_TIMING_CNTL") supports a power control function, and a transmit and receive mode switching function. When a "RADION" signal at terminal 116 is at a logical zero, or low, power to the radio is turned off, and circuit portions which support various radio operations are also powered down, placing the transceiver module 89 into a standby or sleep mode to conserve power. Circuit elements which preferably would become disabled in the shutdown mode include typical digital input pullup elements, filters, amplifiers and power control circuits. Also, all digital output signals from the communication interface circuit 90 are disabled. The clock oscillator 107 continues to operate. However, the clock output will not be gated to other respective circuit elements of the communication interface circuit 90. Terminal 117 of the timing control circuit 115 receives a push-to-talk or transmit-receive switching signal ("PTTL"). The PTTL function is preferably chosen such that when the transmit-receive signal is in a logical one or high signal state, the communication interface circuit 90 is in a data receive mode with transmit functions being inactive. In this mode the transceiver module 89 may receive data to be relayed to the data terminal 88. When the PTTL-signal at the terminal 117 is driven "low" the transmit mode of the communication interface circuit 90 becomes activated.

A clock generator circuit 120 ("CLK_GEN") represents a timing signal generator circuit for a number of timing signals of programmable duration or frequencies. A signal length, signal delay length, or a frequency would be derived from a decoded reference value of one of the predetermined values stored in the memory circuit 101. The transmit cycle clock generation function of the clock generator circuit 120 is driven by the master clock oscillator circuit 107 to generate a transmit timing cycle clock signal ("TX_TIMING_CLK"). For example, from a four-bit digital value programmed into the memory circuit 101, decoded frequency divisors in a chosen range from 8 through 262,144 may be obtained. The resulting transmit timing cycle clock signal in turn becomes an elemental timing unit, a predetermined multiple of which constitutes a single transmit timing cycle. In the described circuit 90, a sequence of sixteen timing cycle clock signals constitutes a basic transmit cycle. The frequency of the timing cycle clock signal is programmable as a ratio of clock pulses from the master clock oscillator circuit 107. A frequency division ratio may be chosen, for example, to provide a transmit timing signal frequency of 1,000 hz, for example, resulting in a timing cycle of 16 milliseconds. In generating the desired transmit timing clock signal frequency, the clock generator circuit accesses and decodes a reference value stored in the memory circuit 101. The RESET/POWERONL signal from the oscillator circuit 107 is coupled to the clock generator circuit 120 to reset the transmit timing signal cycle.

Figure 6:
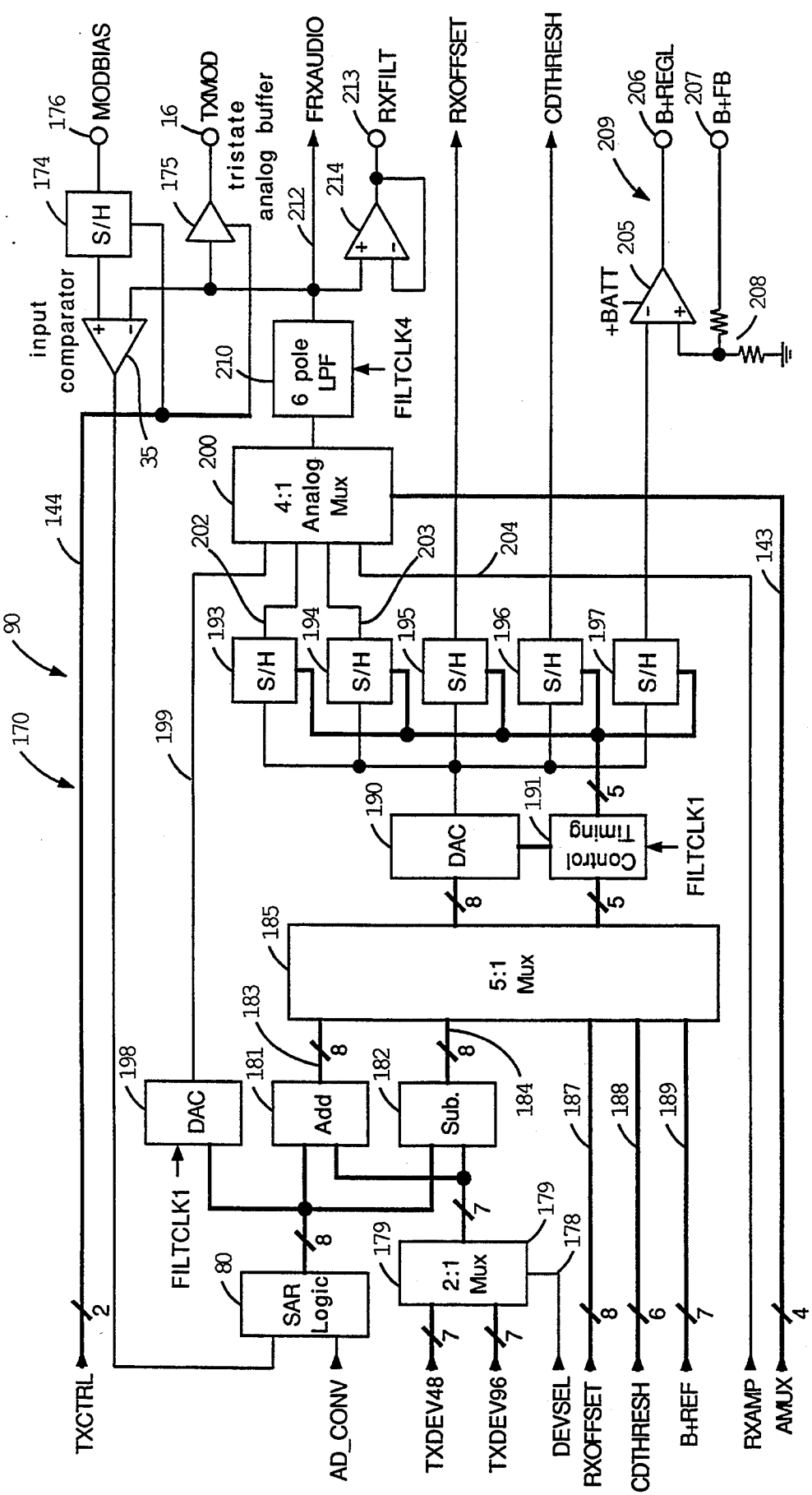
Figure 8:
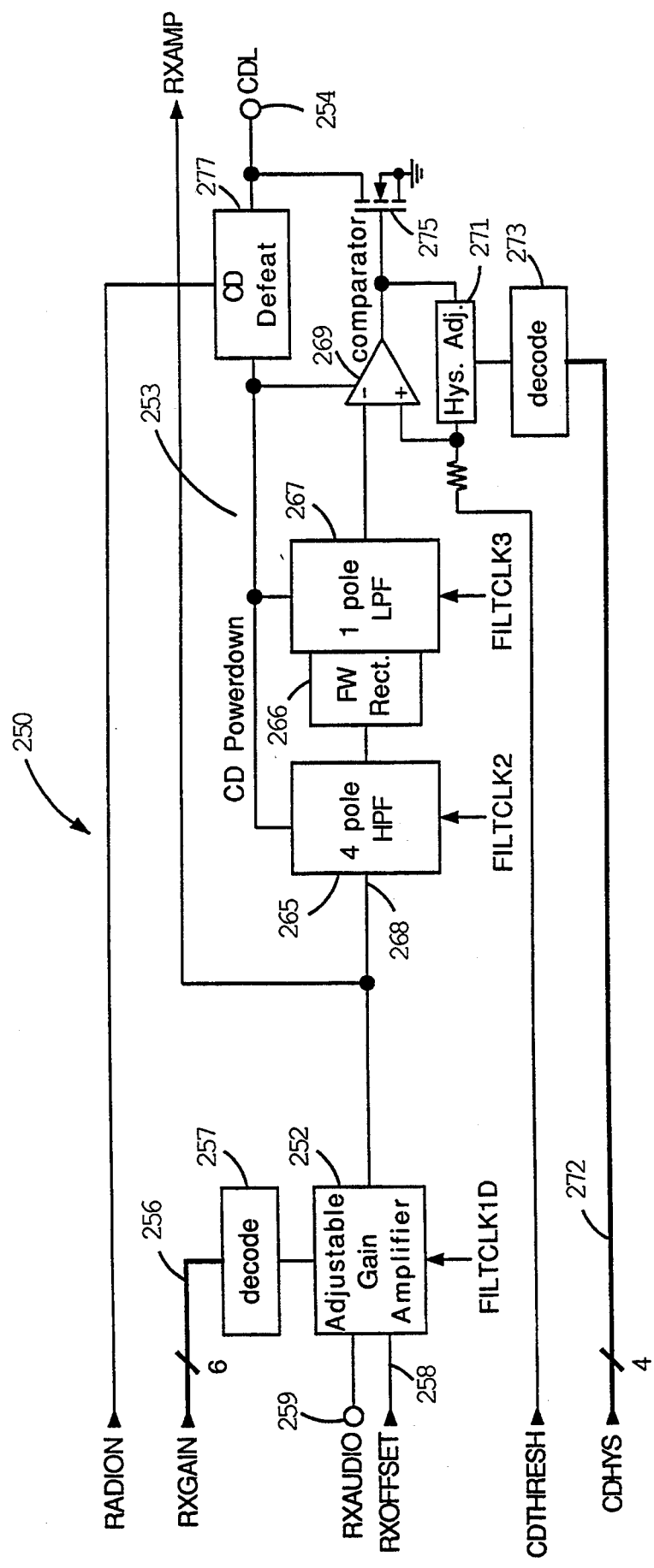

The master clock signal is further applied to generate programmed various clock signals, such as the filter clock signals FILTCLK1, FILTCLK1D, FILTCLK2, FILTCLK3 and FILTCLK4, for example. These clock signals are applied as functional clock signal inputs to respective filter and digital-to-analog converter functions, as shown in FIGS. 6 and 8. Each of the clock signals has a frequency of a predetermined ratio of the master clock frequency of the oscillator circuit 107. The particular ratio of each of the clock signals is established by decoding a reference value stored in a designated location of the memory circuit 101, and is programmable to optimize the respective function to which it is applied. A data rate select signal (DRS) may be applied to the clock generator circuit via input terminal 121, the signal being indicative of a selected data rate. In response to the data rate selection, the FILTCLK1 signal may be altered to provide a correspondingly faster or slower clocking rate. The DRS signal may further provide a DEVSEL signal during the transmit mode of the communication interface circuit 90.

The transmit timing clock signals generated by the clock generator 120 are applied through the transmit timing control circuit 115 to a time state control circuit 125 ("TIME_STATE_CNTL"). The time state control circuit accesses programmed values from the memory circuit 101 via data bus 126 to provide selected transmit and receive control functions. In a preferred embodiment a time state control circuit 125 generates 16 control states. Following state 15, the time state control circuit will hold or wait in the "zero" state. Also, a timing control lock signal value ("TXTIMINGLOCK") may be programmed into the memory circuit 101 to reserve certain timing states for start up control signals and the remainder of the states in the cycle for the generation of signals needed during the shutdown of the transmit cycle. The time state control circuit will "lock" when a state is reached, which corresponds to the programmed value, until the PTTL has been released.

External signals provided by the time state control circuit 125 are shown in FIG. 5 on terminals 128 through 131 as XMITB+L, 5VRXONL, 5VTXONL and READYL, respectively. In various signal designations referred to herein, those ending with the letter "L", indicate that the respective active state of the signal is a low or logical "zero" state. The XMITB+L signal at terminal 128 controls the activation of a transmit power amplifier section (not separately shown) of the transceiver module 89 shown in FIG. 4. The transmit power may need to be delayed into the start up cycle until the quiescent state bias voltage of the respective transmit oscillator circuit at the terminal 16 (FIG. 1) has been sensed and locked in. Consequently a particular timing value for the XMITB+L value is programmed into memory circuit 101 to permit the signal length to be fully variable over the entire period of the transmit timing cycle. Various driver signal outputs may be buffered as shown at 132 through 134. The XMITB+L output may drive an external transistor switch through an external current limiting resistor through its buffer as schematically indicated at 132. The 5VRXONL signal shown at terminal 129. The output signal may drive in one configuration an external transistor switch through an external current limiting resistor, the buffer shown schematically at 133, to provide power to a typical receive section (not separately shown) of the transceiver module 89. Since power-up and power-down times may vary among receiver sections of various types of the transceiver module 89, the signal length is also fully programmable within the transmit timing cycle. Similarly, the 5VTXONL signal at the terminal 130 is a programmable control signal for the control of the transmit power section of the transceiver module 89. The output signal also may drive an external transistor switch through an external current limiting resistor, its buffer shown schematically at 134, to power-up a transmitter section, not separately shown, of the transceiver module 89. At the end of a transmission operation the signal would be removed to, conversely, power down the transmitter section. In that power-up and power-down cycle times may differ among various types of the transceiver module 89, the signal is also programmable over the entire transmit timing cycle. The READYL signal is a signal which may be communicated to the data terminal 88, also in reference to FIG. 4, to indicate that after a transmit cycle, or upon initial power-up of the transceiver module 89, the module 89 is in a ready state. In the ready state the transceiver module may receive a string of data from the data terminal 88 for transmission. The READYL is applied through a buffer as indicated at 135.

A further time state signal generated by the time state control circuit 125 is a circuit-specific internal control signal referred to as AD_CONV or "Analog to Digital Conversion" control signal, as shown at 136. The internal signal AD_CONV does not require an external pull-up or pull-down circuit and is applied to another functional block as seen in further reference to FIG. 6.

Further in reference to FIG. 5, a transmit control circuit or function 140 ("XMIT_CNTL") is coupled to the memory circuit 101 via bus 126, is further coupled to an internal signal corresponding to the XMITB+L signal referred to above, and receives the PTTL signal from the transmit timing control function 115. The transmit control circuit 140 further is coupled via terminal 142 to the data terminal 88 to receive a data string or data message of digital (binary coded) signals (TDX) from the data terminal 88. A single bit decision data inversion value ("TXINV") is preferably gated into the TDX signal to determine the sense or polarity of high and low signals to be transferred from the data terminal to the transceiver module. The data inversion decision relates to the manner in which the respective transceiver module treats data signals for transmission. If an inversion invariably takes place during the transmission of data messages, the TXINV signal needs to effect a second inversion to enable the signals to be received with an expected sense or polarity orientation. The output signals or control signals of the transmit control circuit 140 are a data control signal ("AMUX") applied to a four-line data bus 143 and a transmit-receive control signal ("TXCNTL") applied to a two-line data bus 144, the function of which signals being best understood in reference to FIG. 6.

Further in reference to FIGS. 5 and 10, a receive detector clamp control circuit or function 150 is coupled via the data bus 126 to the memory circuit 101 to access a three-bit word RXCLAMP stored in the memory circuit. The receive detector clamp circuit 150 includes a data flip-flop circuit bank 151 which may be reset with the RESET/POWERONL ("RESETL") signal as shown in FIG. 10 as a preferred gate level representation of the receive detector clamp control circuit 150 in FIG. 5. The flip-flop bank 151 is clocked by the TX_TIMING_CLK signal to sample and shift an unbuffered timed signal 5VRXONL as generated by the time state control circuit 125 into its bank 151 of flip-flops. The sampled and shifted bits are applied in accordance with their sampled delay to a bank 152 of NAND gates. As shown in FIG. 10, the value of the stored three-bit word RXCLAMP is also decoded and is gated with the decoded 5VRXONL at the NAND gate bank 152. The resulting output signal RXCLAMP consequently contains a programmed delay component of 1 through 8 states of the 5VRXONL signal. The RXCLAMP signal is further applied as best seen with respect to FIG. 7.

Again in reference to FIG. 5, the memory circuit provides further for storing reference values for selected signal deviation values. For example, TXDEV48 and TXDEV96 selectively quantify signal deviation levels for preferred 4800 and 9600 baud binary data transmission bias signal levels at the modulation input terminal (FIG. 1). The TXDEV48 and TXDEV96 signals are read out of memory over respective signal bus lines 154 and 155. Other stored reference values pertain to the generation of control signals RXOFFSET, CDTHRESH and B+REF. The respective stored values are read from the memory circuit 101 over respective signal control bus lines 157,158 and 159. Their application, as well as that of the TXDEV48 and TXDEV96 signals may be understood in reference to FIG. 6.

FIG. 6 represents an interfacing circuit portion of the communication interface circuit 90, which interfacing portion is designated generally by the numeral 170. Various of the previously described timing and control signals are applied to the interfacing circuit portion 170. The timing and control signals determine timing sequences and signal levels of data signals transferred between the data terminal 88 and the transceiver module 89. The TXCTRL signal is applied via data lines 144 to a sample-and-hold (S/H) circuit element 174 which preferably precedes the input comparator circuit 35 in the described embodiment of the interfacing circuit portion 170. The TXCTRL signal is further applied to drive a tri-state analog buffer 175 which applies the modulated signal levels to the modulation input terminal 16. The modulated signal drives the frequency modulation of the transmitter section of the transceiver module 89 (FIG. 4). It should be understood that the terminal 16 may be coupled directly to a modulator bias signal terminal 176 when the radio modulation input signals generate the modulation bias voltage or signal level. As described above, the MODBIAS signal may be the sampled quiescent signal level with respect to which the data signal levels will be established. As an alternative, the quiescent signal level or bias voltage may be established at a predetermined signal level which may be fixed for established transmitter conditions. Thus, the interface circuit 170 allows the MODBIAS signal to be obtained from a source separate from that at the terminal 16 during the quiescent state of the modulation circuit 15 shown in FIG. 1.

The analog output signal from the amplifier 35 is placed into the successive approximation register (SAR) 80, substantially in the same manner as described with respect to the SAR 80 in FIG. 3. The AD_CONV signal represents the trigger signal for the sampling of the analog signal level and for storing the corresponding digital value of the sampled signal level in the register circuit 80. The circuit 170 differs from the embodiment described with respect to FIG. 3 in the logic manipulation to determine deviations from the quiescent state bias signal level or the MODBIAS signal. Desirable modulation deviations differ at various preferred data transmission rates. The desired signal deviation level from the quiescent signal level corresponding to the unmodulated channel frequency of the transmitted signal may be dynamically calibrated for desired data transmission frequencies over designated types of the transceiver module 89. The calibrated deviations may differ among units of the same type of transceiver. In the described embodiment the two preferred data transmission rates are standard 4800 and 9600 baud rates. One of the respective reference values TXDEV48 and TXDEV96, as programmed after calibration into the memory circuit 101, is selectable by a selection signal DEVSEL applied via data line 178 to a digital logic multiplexing circuit 179 (2:1 MUX). The selected reference value TXDEV48 or TXDEV96 is applied to respective digital adder and subtractor circuits 181 and 182, which generate respective digital values corresponding to desired signal level variations for respective high and low bias signals with respect to the reference channel frequency or quiescent state signal level. The generated digital values for the high and low bias values are coupled via respective data buses 183 and 184 to a quint (5:1) digital multiplexing circuit function 185 (5:1 MUX). The remaining three reference values which are coupled via respective bus lines 187, 188 and 189 to the 5:1 MUX circuit 185 are the stored values identified as RXOFFSET, CDTHRESH and B+REF. The RXOFFSET, CDTHRESH and B+REF values control DC-offset voltage compensation of the received signals, a carrier detect threshold value and a calibration value for controlling the regulated power supply, respectively. The 5:1 MUX circuit 185 sequentially couples the five reference values to a digital-to-analog circuit 190 (DAC) in accordance with a timing cycle established by the FILTCLK1 timing sequence. A timing control circuit 191 is coupled and applies the FILTCLK1 timing signal to the 5:1 MUX circuit 185, to the digital-to-analog circuit 190 and to each of 5 sample-and-hold circuit elements 193 through 197. The sample-and-hold circuits 193 through 197 store the respective analog (voltage level) quantities of the digital values as converted by the DAC circuit 190. Each stored analog value remains in its respective circuit 193 through 197 until refreshed or altered by a subsequent voltage signal command by the timing circuit 191 to store an updated signal level. The sampled MODBIAS voltage signal which is digitally stored in the SAR circuit 80 is preferably reconverted to an analog signal by a further digital-to-analog function of circuit element 198 (DAC). The DAC circuit 198 is in the preferred embodiment also driven by the FILTCLK1 timing signal. The analog output signal from the DAC circuit 198 is applied via data line 199 directly to a quad analog multiplexing circuit 200 (4:1 ANALOG MUX). The high and low modulation signals as stored in the sample-and-hold circuits 193 and 194, are also applied as inputs to the analog multiplexing circuit 200 via data lines 202 and 203, respectively. An amplified signal received from the receiver section of the transceiver module 89 is a fourth signal to be applied via data line 204 to the analog multiplexing circuit 200 to be selectively switched.

Analog signal equivalents of the three remaining digital reference values RXOFFSET, CDTHRESH and B+REF are applied after conversion by the circuit 190 to the sample-and-hold circuits 195, 196 and 197, respectively. It is to be realized that the voltage levels stored in the sample-and-hold circuits 195, 196 and 197 are not to be considered as variables, but rather as level controlled reference signals in the operation of any one combination of data terminal 88, communication interface circuit 90 and transceiver module 89, as shown in FIG. 4. Once a combination of the components has been configured and has been calibrated, the reference values programmed into the described memory circuit 101 are expected to remain stored therein during the working life of the data terminal 88. When the interface circuit 170 is powered down, the voltage levels at the respective sample-and-hold circuits may disappear. However, when power is restored to the communication interface circuit 90, the analog signal levels corresponding to the respective, permanently programmed reference values would be promptly restored to the sample-and-hold circuits 195, 196 and 197, for example.

The analog voltage level signals stored in the sample-and-hold circuits 195, 196 and 197 are respectively designated as RXOFFSET, CDTHRESH and B+REF signals. The B+REF signal is preferably applied to a feedback amplifier regulator circuit 205. The output B+REGL signal from the regulator circuit 205 constitutes the control signal applied at terminal 206 for controlling external elements of a typical switched power supply circuit, the power section of which typically may be part of the transceiver module 89. A typical power circuit controlled by the regulation provided by the B+REF signal may, for example, typically couple the output signal B+REGL at terminal 206 through a current limiting resistor to a base of an external power PNP pass transistor, or the output signal might be coupled through an external pullup transistor to the gate of a P-channel power MOSFET transistor.

The B+FB signal applied to terminal 207 is a feedback signal which is applied to the non-inverting input of the regulator amplifier circuit 205 to close the loop from such external elements for a feedback regulation of the B+REGL signal. The B+FB signal is applied to the amplifier circuit 205 through a voltage divider circuit 208, such that the signal level applied to the circuit 205 is one-half of the fed back signal level from the external elements of the power supply designated generally by 209. Thus, the reference value stored as B+REF in the memory circuit 101 is also one-half of the desired output voltage from the amplifier circuit 205. With the output voltage from the digital-to-analog converter circuit 190 and the sample-and-hold circuit 197 ranging from 2.0 to 5.0 volts, as a preferred example, the voltage range at the output terminal 206 and that of the power supply 209 would be at twice that level, ranging between 4.0 and 10.0 volts.

The analog signals RXOFFSET and CDTHRESH, stored at the respective sample-and-hold circuits 195 and 196 are applied as bias and reference signal levels in a signal processing function of the raw signal RXAUDIO, as shown in FIG. 8. A signal received from a conventional audio type FM receiver section is preamplified and preprocessed, and is then applied as the RXAMP signal to the analog multiplexing circuit 200 shown in FIG. 6.

The switched output from the analog multiplexing circuit 200 is applied directly to a low pass filter element 210. The filter element 210 is, in the preferred embodiment, a 6-pole, switched capacitor linear phase type low pass filter. Currently preferred characteristics for the filter element are as follows:

| Pole locations: alpha + j*beta format designation | |
| --- | --- |
| Corner frequency: 2700 hz., filterclock = 50 khz. | |
| alpha1 = 2404 | beta1 = 1110 |
| alpha2 = 2223 | beta2 = 3288 |
| alpha3 = 1661 | beta3 = 5349 |
| Corner frequency: 5400 hz., filterclock = 100 khz. | |
| alpha1 = 4808 | beta1 = 2220 |
| alpha2 = 4446 | beta2 = 6577 |
| alpha3 = 3322 | beta3 = 10697 |

The corner frequency of the filter is desirably scalable by changing the filterclock frequency, namely the frequency of the FILTCLK1 signal. Thus, with the filter element 210 being operable under one of two preferred frequency conditions, one at a frequency twice that of the other, the FILTCLK4 signal may simply be gated in a typical signal gating manner to apply one or the other frequency to the filter element 210, in accordance with the desired frequency or speed. The filter element 210 desirably also includes a programmable signal inversion function ("RXINV"), for inverting the polarity of the filtered output signal in response to an input signal as programmed in the memory circuit 101. A normally expected signal sense condition, referred to as "mark-hold", is initiated by a high signal level moving toward low or ground. Voice message transmissions in contrast to data message transmissions typically have no signal sense requirement. Thus, for typical voice frequency transceiver modules 89 (FIG. 4), some commercially available types of transceiver modules may introduce a signal sense which is inverted with respect to the normally expected signal in data message applications. The signal inversion function may be programmed into the memory circuit 101 if so determined in a prior calibration of the respective transceiver module 89, the calibration determining the actual signal sense polarity of the module and subsequent programming correcting for any inverted signal sense of the respective transceiver module.

During the transmit mode of the communication interface circuit 90, the tristate analog buffer applies modulated and filtered data signals as modulation signal strings at a selected data rate as TXMOD signals to the modulation terminal 16. But after the interface circuit 90 is in the receive mode, the analog multiplexing circuit 200 applies filtered received data strings as FRXAUDIO signals to the data line 212. The signal RXFILT is applied to output terminal 213 through the output buffer amplifier 214. The RXFILT signal is contemplated to be a test signal only and is not further applied as a data or control signal.

Figure 7:
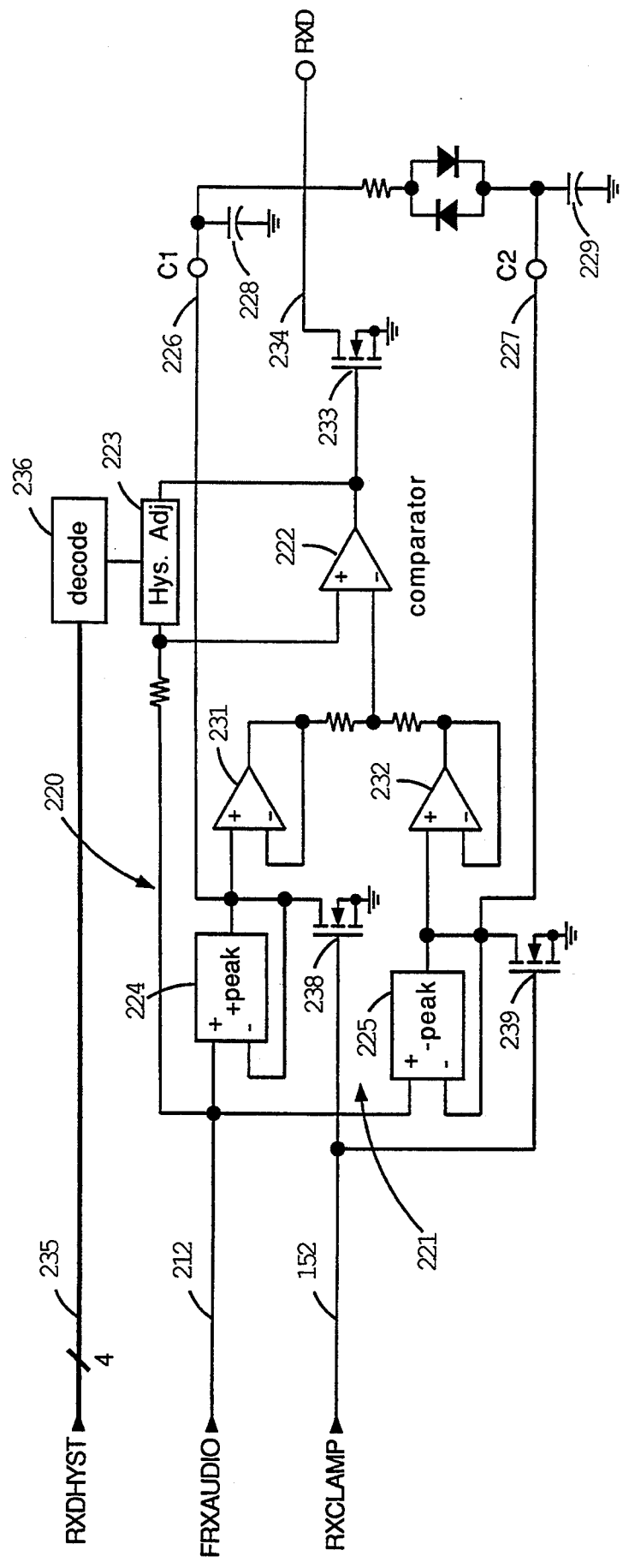

In reference to FIG. 7, the FRXAUDIO signal is applied to a signal processing circuit designated generally by the numeral 220. The signal processing circuit 220 includes a peak to peak detector circuit 221 which establishes, generally described, an average signal level between successive peaks. A comparator circuit 222 compares the applied signal with respect to the determined average between peaks and establishes high or low signal levels with respect thereto. Signal hysteresis is modified by a hysteresis adjusting feed back circuit 223 of the comparator circuit 222. High and low peak voltages are detected by respective peak detectors 224 and 225, are applied to terminals 226 and 227 which in turn are coupled to respective external capacitors 228 and 229 for storing the detected peak voltages. An external back-to-back diode and resistor network 230 may be coupled between the two external capacitors 228 and 229 to shape the stored peak voltages with respect to each other. The detected peaks are applied through buffer amplifiers 231 and 232 to the negative input terminal of the comparator amplifier 222. The output from the comparator 222 drives the gate of a MOSFET transistor switch 233. The output of the MOSFET transistor switch 233 at the terminal 234 constitutes a normalized digital RXD signal which may be received by the data terminal 88 as a signal input for example.

Because of variations in signal output characteristics among various transceiver modules, the optimization of signal switching makes an adjustable hysteresis correction desirable. For example, a combination of feedback resistors of the comparator amplifier 222 may be selectively switched into or out of the feedback loop to provide a programmably variable hysteresis adjustment. In calibrating the output signal RXD at the terminal 234 to a test signal, an optimum impedance value for the hysteresis adjustment may be determined. A determined reference value RXDHYS may then be stored in the memory circuit 101. The stored reference value RXDHYS may be applied, for example, through a data bus 235 to a decode circuit function 236 (DECODE), which may gate, for example, resistive impedances, such as by transistor switches. In the described embodiment a four-bit binary resolution of a preferred hysteresis voltage range between zero and 0.5 volts may be programmed.

Transmit noise at the conclusion of a transmit cycle may cause the peak-to-peak detector circuit 221 to overload and fail to initialize processing the received FRXAUDIO signals. The RXCLAMP signal is applied via data line 152 to respective switches 238 and 239 to clamp the detected peak signals at the initiation of the receive mode to ground. The length of the RXCLAMP signal from the end of the transmit cycle into the beginning of the receive cycle is programmed in accordance with transmit noise characteristics of the selected transceiver module, thereby enabling the communication interface circuit 90 to interface with transceiver modules with a range of noise characteristics.

FIG. 8 depicts a received signal normalization and detection circuit 250. The normalization circuit includes an initial signal amplification stage 252 and a signal detection circuit 253 which determines the presence of a carrier signal and, in response, generates a carrier detect signal CDL at a terminal 254. The signal amplifier stage or circuit 252 and signal filters in the signal shaping circuit 253 employ in a preferred circuit implementation a well known capacitive switching technology. The received RXAUDIO signal is normalized by the adjustable gain amplifier 252 in dependence on a number of specifically determined values which ultimately affect the output of the amplifier 252. A reference value RXGAIN may be stored in the memory circuit 101 to be applied via data bus 256 and a decode function 257 to provide a predetermined amplification scale factor. In addition, the variable gain amplifier 252 is driven by the clocking signal FILTCLK1D which has the same frequency as the FILTCLK1 signal but is phase-shifted with respect thereto. The FILTCLK1D signal is the clocking signal for the switched capacitor technology employed in the variable gain amplifier 252. It should be noted that the FILTCLK1D signal may be specifically varied by changing the reference value FILTCLK1 stored in the memory circuit 101. The gain of the amplifier circuit may consequently be adjusted by the RXGAIN value which selects for example the pattern of switched capacitors.

Another input signal applied to the adjustable gain amplifier circuit 252 which may be configured for a specific transceiver module is the RXOFFSET signal. Received signal messages from transceiver modules and from FM radio receivers in general typically include a DC bias signal component. Since the DC bias varies among radio units, it has been found desirable to provide a unit specific offset value which may be determined during the calibration process of the transceiver module, or may be approximated as found from classes or groups of radio units. The RXOFFSET signal is applied to the amplifier circuit 252 via line 258 to eliminate the DC bias voltage component of the RXAUDIO signal applied to the amplifier circuit 252 via the terminal 259.

The signal shaping circuit or carrier detect circuit 253 operates on the recognized principle that high frequency, open noise received by a radio is significantly reduced when a strong radio carrier signal is received, even though no modulation may be present. The carrier detect circuit employs in a preferred embodiment, as an example, a series of a four-pole high pass filter 265, a full wave rectifier circuit 266 and a low pass filter 267. The normalized received signal RXAMP is applied to an input terminal 268 of the high pass filter 265. The output signal from the low pass filter 267 is coupled to the inverting input terminal of a comparator 269. The analog equivalent signal level of CDTHRESH stored in the sample and hold circuit 196 is coupled to the non-inverting input terminal of the comparator amplifier 269. The signal level of CDTHRESH may be determined by calibration to establish a signal switching level for the comparator amplifier 269 at which a carrier signal detection occurs reliably. Since noise characteristics and signal to open noise characteristics vary among various radio types, a desired threshold range adjustment between 3.5 to 5.0 volts, as may be implemented desirably by a six-bit digital resolution, is desirably supplemented by the capability of adjusting the filter elements. The four-pole high pass filter 265 preferably with a nominal corner frequency of 9000 hz. has preferably a scalable range of 4500 to 18000 hz. The lowpass filter 267 has a nominal corner frequency of 500 hz. which is scalable over a preferred range of 100 to 2000 hz.

The comparator 269 preferably includes a hysteresis feedback loop 271 for adjusting the hysteresis characteristics of the carrier detect switching point. Since it may be desirable to vary the hysteresis characteristics of the comparator amplifier 269, a CDHYS reference value as stored in the memory circuit 101 may be applied via data bus 272 and a decoding function 273 to configure the feedback loop, for example by selectively switched resistive elements as controlled by the stored CDHYS value. In a preferred configuration, a four bit reference value provides the resolution in a hysteresis adjustment range between zero and 0.5 volts.

The output signal may be applied through a MOSFET switch 275 as an open drain output to the terminal 254. The carrier detect signal may be disabled by grounding the terminal 254 instead of coupling it through a typical pullup resistor to B+, such as +5 volts. A carrier detect disable or defeat function is illustrated by the CD DEFEAT circuit 277. The level on the CDL terminal 254 may be sampled and latched when the RADION signal is driven high by a typical flip-flop function of the circuit 277. The entire carrier detect function 253 may be powered down if the CDL signal is at ground at that time.

The foregoing is a description of preferred circuit elements and functions for interfacing a digital data terminal with any of a number of analog data transmission devices, such as the referred to transceiver modules. It is understood that at least some of the described relationships and considerations apply to transmitters apart from receiver sections, and likewise to radio receivers apart from transmitter sections. It is further understood that the described relationships and considerations apply to the transmission of data from any type of data source independently or in the absence of the referred to data terminal.

Various other changes and modifications in the structure of the described embodiments are possible without departing from the spirit and scope of the invention which is sought to be defined by the following claims.

What is claimed is:

1. A method of controlling data flow between a digital data device and an analog communication device which includes a voltage controlled oscillator circuit, said method including receiving digital data messages, generating an analog signal modulated with said digital data messages and applying said modulated analog signal to the oscillator circuit of the analog communication device, said method further comprising:

storing a digitally coded value equivalent of a quiescent bias signal level which when applied to the oscillator circuit will cause the oscillator circuit to operate at a channel frequency;

generating a high and a low modulation analog signal level with respect to said stored digitally coded value equivalent of said quiescent bias signal level; and applying to the oscillator circuit said analog signal modulated with said high and low modulated analog signal levels in accordance respectively with high and low data signals of said received digital data messages.

2. The method according to claim 1, wherein generating said high and a low modulation analog signal levels with respect to said stored digitally coded value equivalent of said quiescent bias signal level comprises reading said stored digitally coded value and converting said read digitally coded value to an analog center signal corresponding to said quiescent bias signal level, and adding to and subtracting from said analog center signal a predetermined voltage level, thereby forming said high and low modulation analog signal levels, and wherein applying to the oscillator circuit said modulated analog signal comprises selectively coupling one of said high and low modulation analog signal levels to the oscillator circuit in a sequence corresponding respectively to high and low digital data signals of said digital data messages.

3. The method according to claim 1, further comprising storing a plurality of digitally coded deviation values, reading at least one of said plurality of digitally coded deviation values as a selected deviation value representative of a predetermined deviation magnitude with respect to said one digitally coded value equivalent to the quiescent bias signal level, and wherein generating said high and low modulation analog signal levels comprises adding said selected deviation value to said one digitally coded value to generate a high deviation value and subtracting said selected deviation value from said one digitally coded value to generate a low deviation value.

4. The method according to claim 3, wherein generating said high and low modulation analog signal levels comprises converting said high deviation value and said low deviation value to respective high and low analog signal levels and applying said high and low analog signal levels to first and second sample and hold circuits respectively, and wherein applying to the oscillator circuit said modulated analog signal comprises selectively coupling one of said high and low modulation analog signal levels to the oscillator circuit in accordance with a sequence of high and low data signals in said digital data message.

5. The method according to claim 3, further comprising receiving a control signal indicative of a selected data rate of at least first and second data rates for receiving said digital data messages, reading a first of said plurality of digitally coded deviation values as said selected deviation value upon receipt of said control signal indicative of said first data rate and reading a second of said plurality of digitally coded values as said deviation value upon receipt of said control signal indicative of said second data rate.

6. The method according to claim 5, wherein generating said high and low analog modulation analog signal levels comprises converting said high deviation value and said low deviation value to respective high and low analog signal levels and applying said high and low modulation analog signal levels to first and second sample and hold circuits respectively, and wherein applying to the oscillator circuit said modulated analog signal comprises selectively assessing the first and second sample and hold circuits to provide a sequence of said high and low modulation analog signal levels to the oscillator circuit corresponding to a sequence of high and low data signals in said digital data message.

7. The method according to claim 1, wherein the analog communication device is an FM radio frequency transceiver module, said method including transmitting from the transceiver module modulated signals of a predetermined deviation from said channel frequency in response to said applied high and low modulated analog signal levels, and receiving signals representing data messages from remote transmitter stations and transferring said received data message signals to the digital data device includes decoding said received data message signals as signals of predetermined modulated signal strength with respect to a known DC bias signal component, comprising:

storing a plurality of digitally coded values as reference values of predetermined magnitude;

switching the transceiver module between a transmit mode for a first predetermined time period and applying said modulated analog signal to the oscillator circuit during said first predetermined time period, and switching the transceiver module at the end of said first predetermined time period to a receive mode during which period data received by the transceiver module are transferable as data messages to the digital data device;

converting said received data message signals into digital data signals; and decoding one of the plurality of said digitally coded values as a receive disable reference value; and generating a timed receive disable signal of a length corresponding to a magnitude of said decoded receive disable reference value for disabling said converting of said data message signals during a second predetermined time period following switching the transceiver module to said receive mode.

8. The method according to claim 7, further comprising routing said analog signal modulated with said high and low modulated analog signal levels corresponding to said digital message through a signal filter while the transceiver module is in said transmit mode, and routing the received digital data messages through the signal filter while the transceiver module is in said receive mode.

9. The method according to claim 7, further comprising amplifying said received data message signals, decoding a respective one of said stored digital coded reference values as a predetermined value of a received signal DC bias level of said received data message signals to be amplified, correcting for said received signal DC bias level to cancel the DC bias of said received data message signals prior to amplifying them, decoding a further one of said stored digitally coded reference values as a gain reference value, and amplifying said received data message signals in accordance with a gain corresponding to said decoded gain reference value chosen in accordance with an expected signal level of said received data message signals, thereby normalizing a signal output from the variable gain amplifier to a predetermined signal level.

10. The method according to claim 7, wherein said converting of said received data message signals into digital data signals comprises detecting peak signal levels of said received data message signals and generating an average signal level with respect thereto, determining signal amplitudes with respect to said average signal level, decoding a further of said plurality of stored digitally coded reference values indicative of a predetermined signal switching hysteresis characteristic, and adjusting a feedback characteristic of a comparator in accordance with said decoded signal switching hysteresis reference value for normalizing a switched output signal by the comparator, and driving a transistor switch with said normalized switched output, thereby generating said digital data signals in accordance with said received data messages.

11. A method of controlling data flow between a digital data device and an analog communication device which includes a voltage controlled oscillator circuit, said method including receiving digital data messages, generating an analog signal modulated with said digital data messages and applying said modulated analog signal to the oscillator circuit of the analog communication device, said method further comprising;

storing a value equivalent of a quiescent bias signal level which when applied to the oscillator circuit will cause the oscillator to operate at a channel frequency;

adding a deviation value to said stored quiescent bias signal level value to obtain a high modulation value;

subtracting said deviation value from said stored quiescent bias signal level value to obtain a low modulation value;

generating high and low modulation analog signal levels which correspond to said high and low modulation values, respectively; and applying to the oscillator circuit said analog signal modulated with said high and low modulation signal levels in accordance with high and low digital data signals of said received digital messages.

12. An interface device for controlling data flow between a digital data device which includes a message source for providing data messages in digital format and an analog communication device which includes a voltage controlled oscillator circuit, said interface device including means for receiving said digital data messages and for generating and applying an analog signal modulated with said digital data messages to the oscillator circuit of the analog communication device, said interface device comprising;

means for storing a digitally coded quiescent bias value corresponding to a quiescent bias signal level which when applied to the oscillator circuit will cause the oscillator circuit to operate at a channel frequency;

means for generating a high and a low modulation analog signal level with respect to said stored digitally coded quiescent bias signal value; and means for applying to the oscillator circuit said analog signal modulated with said high and low modulation analog signal levels in accordance respectively with high and low digital data signals of said received digital data messages.

13. The interface device according to claim 12, wherein said means for generating said high and low modulation analog signal levels with respect to said stored digitally coded quiescent bias signal value comprises means for reading and converting said stored digitally coded quiescent bias signal value to an analog center signal corresponding to said stored digitally coded quiescent bias signal value, and means for adding to and subtracting from said analog center signal a predetermined voltage level, thereby providing said high and low modulation analog signal levels, and wherein said means for applying to the oscillator circuit said modulated analog signal comprises means for selectively coupling one of said high and low modulation analog signal levels to the oscillator circuit in a sequence corresponding respectively to high and low digital data signals in said respective data messages.

14. The interface device according to claim 12, further comprising means for storing a plurality of digitally coded values, means for reading at least one of said digitally coded values as a deviation value representative of a predetermined deviation magnitude with respect to said stored digitally coded quiescent bias signal value, and wherein said means for generating said high and low modulation analog signal levels comprises means for adding said deviation value to said digitally coded quiescent bias signal value to generate a high deviation value and means for subtracting said deviation value from said digitally coded quiescent bias signal value to generate a low deviation value.

15. The interface device according to claim 14, further comprising at least one digital to analog converter circuit and at least first and second analog signal sample and hold circuits for retaining sampled analog signal levels, and wherein said means for generating said high and low modulation analog signal levels comprises means for converting said high deviation value and said low deviation value respectively to said high and low analog signal levels and for applying said high and low analog signal levels to said first and second analog sample and hold circuits respectively, and said means for applying to the oscillator circuit said modulated analog signal comprises means for selectively coupling one of said high and low analog signal levels to the oscillator circuit in accordance with a sequence of high and low digital data signals in said data messages.

16. The interface device according to claim 14, further comprising means for receiving a control signal indicative of a selected data rate of at least first and second data rates for receiving said data messages, means for reading a first of said plurality of digitally coded values as said deviation value upon receipt of said control signal indicative of said first data rate and for reading a second of said digitally coded values as said deviation value upon receipt of said control signal indicative of said second data rate.

17. The interface device according to claim 16, further comprising at least one digital to analog converter circuit and at least first and second analog signal sample and hold circuits for retaining sampled analog signal levels, and wherein said means for generating said high and low modulation analog signal levels comprises means for converting said high deviation value and said low deviation value respectively, to said high and low modulation analog signal levels and for applying said high and low modulation analog signal levels to said first and second sample and hold circuits respectively, and said means for applying to the oscillator circuit said modulated analog signal comprises means for selectively coupling said high and low analog signal levels to the oscillator circuit in accordance with said sequence of said high and low digital data signals of said data messages.

18. The interface device according to claim 12, wherein the analog communication device is an FM radio frequency transceiver module, the transceiver module being operable to transmit modulated signals of a predetermined deviation from said channel frequency in response to said applied high and low modulated analog signal levels and to receive signals representing data messages from remote transmitter stations for transfer of said data messages to said interface device as signals of a predetermined modulated signal strength with respect to a known DC bias signal component, said interface device further comprising:

means for storing a plurality of digitally coded values of a predetermined magnitude, said digitally coded values being reference values;

means for switching the transceiver module to a transmit mode for a first predetermined time period during which said means for applying said modulated analog signal to the oscillator circuit is activated, and at the end of said first predetermined time period to a receive mode during which period data received by the transceiver module are transferable as data messages to the digital data device;

means for converting signals representative of said data messages received from the transceiver module into digital data signals; and means for decoding one of said plurality of digitally coded values to provide a receive disable reference value and for generating a timed receive disable signal of a length corresponding to said receive disable reference value for disabling said means for converting signals during a second predetermined time period following the switching of the transceiver module to said receive mode.

19. The interface device according to claim 18, further comprising a signal filter, and means for routing said analog signal modulated with said high and low modulation analog signal levels in accordance with said high and low digital data signals of said data messages through said signal filter while the transceiver module is in said transmit mode, and for routing said received digital data messages through said signal filter while the transceiver module is in said receive mode.

20. The interface device according to claim 18, further comprising a variable gain amplifier for amplifying the signals representing said data messages received from the transceiver module, means for decoding a respective one of said stored reference values as a predetermined value of a received signal DC bias level of the signals representing said received digital data message, and means for applying said decoded value of said received signal DC bias level to said variable gain amplifier to cancel said decoded value of said received signal DC bias level prior to amplifying said data message signals, and means for decoding a further one of said stored reference values as a gain reference value, means for applying said decoded gain reference value to said variable gain amplifier to modify the gain thereof in accordance with an expected signal level of said data message signals, thereby normalizing a signal output from said variable gain amplifier to a predetermined signal level.

21. The interface device according to claim 18, wherein said means for converting said signals representative of said data messages received from the transceiver module into digital data signals comprises means for detecting peak signal levels of said received data message signals and for generating an average signal level with respect thereto, and comparator means for comparing signal amplitudes with respect to said average signal level to provide a comparator output, said interface device further comprising means for decoding a further one of said stored digitally coded reference values indicative of a predetermined signal switching hysteresis characteristic, means for adjusting a feedback characteristic of said comparator means in accordance with said decoded signal switching hysteresis reference value, thereby normalizing said comparator output signal, a transistor switch having a gate coupled to receive said comparator output signal which drives said transistor switch for generating said digital data signals in accordance with said received digital data messages.

22. An interface device for controlling bidirectional data transfer between a digital data device and a frequency modulated transceiver module having a voltage controlled crystal oscillator circuit operable at a predetermined channel frequency in response to a quiescent voltage level applied to the oscillator circuit, said interface device comprising;

timing control means for controlling an initiation, a duration, and a shut down of a transmit cycle of the transceiver module in response to an external control signal indicative of the digital data device being ready to transmit data via the transceiver module;

means for storing a plurality of reference values including reference values representing digital equivalent values of timed signals for controlling said initiation, said duration and said shut down of said transmit cycle of the transceiver module; and means for decoding selected ones of said stored reference values as timing reference values, for generating timed signals and for applying timed signals to said timing control means in accordance with said stored reference values to control a timing sequence responsive to ramp up and ramp down characteristics of the transceiver module.

23. The interface device according to claim 22, which comprises:

means for decoding at least one of said stored reference values indicative of a timed value with respect to said external control signal for sampling said quiescent voltage level corresponding to said channel frequency of the oscillator circuit at a predetermined timed before data are transmitted by the transceiver module;

means for generating a digital reference signal corresponding to said sampled quiescent voltage level;

means for applying a deviation reference value of said stored reference values to said generated digital reference signal for generating a high and a low deviation value;

means for converting said high and low deviation values to analog signal values corresponding respectively to high and low bias signal levels with respect to said sampled quiescent channel frequency voltage level; and means for transferring a bias signal modulated with said high and low bias signal levels in accordance with a data message to be transmitted by the transceiver module.

24. Apparatus for generating a radio frequency modulated signal of a predetermined center frequency in accordance with binary data having a first data signal level and a second data signal level, said apparatus including a modulator with a node for establishing a quiescent bias voltage at the node for maintaining the accuracy of said predetermined center frequency in accordance with the amplitude of said quiescent bias voltage, said apparatus comprising:

(a) means coupled to the modulator for providing a path to the node to obtain a quiescent level signal whose amplitude is a measure of the amplitude of said quiescent bias voltage;

(b) means for generating a first modulator signal of an amplitude set less than that of said quiescent level signal by a predetermined amount to represent said first data signal level;

(c) means for generating a second modulator signal of an amplitude set greater than that of said quiescent level signal by said predetermined amount to represent said second data signal level; and (d) means for applying said first modulator signal to the modulator when said binary data is at said first data signal level to cause a first frequency deviation of predetermined frequency shift in one direction from said center frequency and for applying said second modulator level signal to the modulator when said binary data is at said second data signal level to cause a second frequency deviation of said predetermined frequency shift in the other direction from said center frequency.

25. Apparatus according to claim 24, wherein there is included a DC modulating-signal-path having electrical characteristics for applying said first and second modulator signals to the modulator, whereby said quiescent level signal compensates for said characteristics of said DC modulating-signal-path so that said first and second frequency deviations are thereby maintained essentially symmetrical relative to said center frequency.

26. A method of operating a transmitter to generate a frequency modulated signal of a predetermined center frequency in accordance with binary data having first and second data signal levels, the transmitter providing at a node a quiescent bias voltage and having a modulator that is responsive to the quiescent bias voltage to maintain the accuracy of said predetermined center frequency, said method comprising the steps of:

(a) establishing a path to the node to obtain a quiescent level signal whose amplitude is a measure of the quiescent bias voltage;

(b) generating a first modulator level signal of an amplitude that is less than that of said quiescent level signal by a predetermined amount to represent said first data signal level;

(c) generating a second modulator level signal of an amplitude that is greater than that of said quiescent level signal by said predetermined amount to represent said second data signal level;

(d) applying said first modulator level signal to the modulator when said binary data is at said first data signal level to cause a first frequency deviation of predetermined frequency shift in one direction from said center frequency; and (e) applying said second modulator level signal to the modulator when said binary data is at said second data signal level to cause a second frequency deviation of said predetermined frequency shift in the other direction from said center frequency.

27. A method according to claim 26, wherein said first and second modulator level signals are applied to the modulator via a DC modulating-signal-path having electrical characteristics, said quiescent level signal being compensated for said characteristics of the DC modulating-signal-path so that said first and second frequency deviations are thereby maintained essentially symmetrical relative to said center frequency.

* * * * *